United States Patent
Cohn et al.

(10) Patent No.: US 9,353,678 B2
(45) Date of Patent: May 31, 2016

(54) REFORMER ENHANCED ALCOHOL ENGINE

(71) Applicant: Massachusetts Institute of Technology, Cambridge, MA (US)

(72) Inventors: Daniel R. Cohn, Cambridge, MA (US); Leslie Bromberg, Sharon, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 14/350,994

(22) PCT Filed: Oct. 9, 2012

(86) PCT No.: PCT/US2012/059332
§ 371 (c)(1),
(2) Date: Apr. 10, 2014

(87) PCT Pub. No.: WO2013/055673
PCT Pub. Date: Apr. 18, 2013

(65) Prior Publication Data
US 2014/0290596 A1    Oct. 2, 2014

Related U.S. Application Data

(60) Provisional application No. 61/546,253, filed on Oct. 12, 2011.

(51) Int. Cl.
*F02B 43/04* (2006.01)
*F02D 19/08* (2006.01)
(Continued)

(52) U.S. Cl.
CPC ............... *F02B 43/04* (2013.01); *C01B 3/366* (2013.01); *F02D 19/084* (2013.01); *C01B 2203/1217* (2013.01); *F02D 19/0655* (2013.01); *Y02T 10/36* (2013.01)

(58) Field of Classification Search
CPC .............. F02D 19/0671; F02D 19/081; F02D 19/0692; F02D 41/3094; F02D 19/084; F02D 19/0665; F02D 19/0655; F02D 19/061; F02D 19/087; F02D 2200/0802; F02M 57/06; F02M 21/0275
USPC ............. 123/3, 1 A, 435, 478, 525, 557, 575, 123/90.15
See application file for complete search history.

(56) References Cited

U.S. PATENT DOCUMENTS

2005/0229872 A1*  10/2005  Lange ..................... C01B 3/323
                                                                123/3
2006/0255319 A1*  11/2006  Sadikay .................. F02B 43/10
                                                                252/373
(Continued)

FOREIGN PATENT DOCUMENTS

EP    1803922 A1    7/2007
JP    59054745 A    3/1984

OTHER PUBLICATIONS

International Search Report and Written Opinion issued on May 2, 2013 in connection with PCT Application No. PCT/US12/59332.
(Continued)

*Primary Examiner* — Stephen K Cronin
*Assistant Examiner* — Long T Tran
(74) *Attorney, Agent, or Firm* — Gesmer Updegrove LLP

(57) ABSTRACT

Reformer-enhanced alcohol engine system. The engine system includes a spark-ignited alcohol engine having a compression ratio in the range of 13-15 and includes a turbocharger or supercharger operatively connected to the engine to provide a pressure boost of at least about 2.5 times atmospheric pressure to cylinders of the engine. A source of alcohol is provided for injection into the engine. A reformer is provided including a low-temperature reforming catalyst in a heat transfer relation with exhaust gas from the engine and arranged to receive alcohol from the alcohol source for reforming the alcohol into a hydrogen-rich gas. Means are provided for injecting the hydrogen-rich gas into the engine and a knock sensor detects knock in the engine. A fuel management control unit is provided which is responsive to the knock sensor to apportion the ratio of alcohol injected into the engine to hydrogen-rich gas injected into the engine. The engine of the invention can provide a 15-25% efficiency gain in a methanol-fueled spark ignition engine relative to a diesel engine in a typical drive cycle.

29 Claims, 1 Drawing Sheet

(51) Int. Cl.
*C01B 3/36* (2006.01)
*F02D 19/06* (2006.01)

(56) References Cited

U.S. PATENT DOCUMENTS

| | | | |
|---|---|---|---|
| 2008/0010993 A1* | 1/2008 | Morgenstern | C01B 3/323 60/780 |
| 2008/0128267 A1* | 6/2008 | Adams | C01B 3/326 204/168 |
| 2008/0135807 A1* | 6/2008 | Adams | B01J 19/088 252/373 |
| 2010/0224167 A1* | 9/2010 | Leone | F02D 19/0684 123/299 |
| 2010/0319635 A1* | 12/2010 | Morgenstern | C01B 3/323 123/3 |
| 2011/0132284 A1* | 6/2011 | Leone | F01N 5/02 123/3 |
| 2011/0137537 A1* | 6/2011 | Leone | F02D 41/0027 701/102 |
| 2012/0150419 A1* | 6/2012 | Pursifull | F02D 41/0027 701/104 |

OTHER PUBLICATIONS

International Preliminary Report on Patentability mailed on Apr. 24, 2014 in connection with International Application PCT/US2012/059332, 5 pages.

* cited by examiner

REFORMER ENHANCED ALCOHOL ENGINE

PRIORITY INFORMATION

This application is a 371 application of PCT Application No. PCT/US12/59332 filed on Oct. 9, 2012 that claims priority to provisional application Ser. No. 61/546,253 filed on Oct. 12, 2011. The contents of which are incorporated herein by reference in their entirety.

BACKGROUND OF THE INVENTION

This invention relates to a spark-ignited engine and, more particularly, to a very high-efficiency, spark-ignited alcohol engine.

Automotive engine efficiency improvements are, obviously, important in meeting the energy needs of the world. Alcohols, such as ethanol and methanol, are known to provide strong knock suppression in gasoline engines by virtue of the intrinsic octane of alcohol fuel along with the effect of evaporative cooling thereby allowing higher compression ratios resulting in higher efficiency. Engines running on alcohol alone are also known.

It is also known that alcohols can be reformed into hydrogen-rich gas for use as a fuel in spark-ignited engines.

It is an object of the present invention to provide an alcohol engine having an efficiency 15-25% higher than a high-efficiency diesel engine, and 40-55% more efficient than a naturally-aspirated port fuel-injected gasoline engine.

SUMMARY OF THE INVENTION

The reformer-enhanced alcohol engine system according to the invention includes a spark-ignited alcohol engine having a compression ratio in the range of 13-15. A turbocharger or supercharger is operatively connected to the engine to provide a high pressure boost, preferably at least about 2.5 times atmospheric pressure, to cylinders of the engine. A source of alcohol is provided for injection of the alcohol into the engine. A reformer, including a low-temperature reforming catalyst, is in a heat transfer relation with exhaust gas from the engine and arranged to receive alcohol from the alcohol source for reforming the alcohol into a hydrogen-rich gas. Means are provided for introducing the hydrogen-rich gas into the engine and a knock sensor is provided for detecting knock in the engine. A fuel management control unit is responsive to the knock sensor so as to apportion the ratio of alcohol injected into the engine to hydrogen-rich gas introduced into the engine and is used to maximize the amount of fuel that is converted into hydrogen-rich gas while preventing knock at high loads by use of use of alcohol injection.

DESCRIPTION OF THE PREFERRED EMBODIMENT

Figure 1:
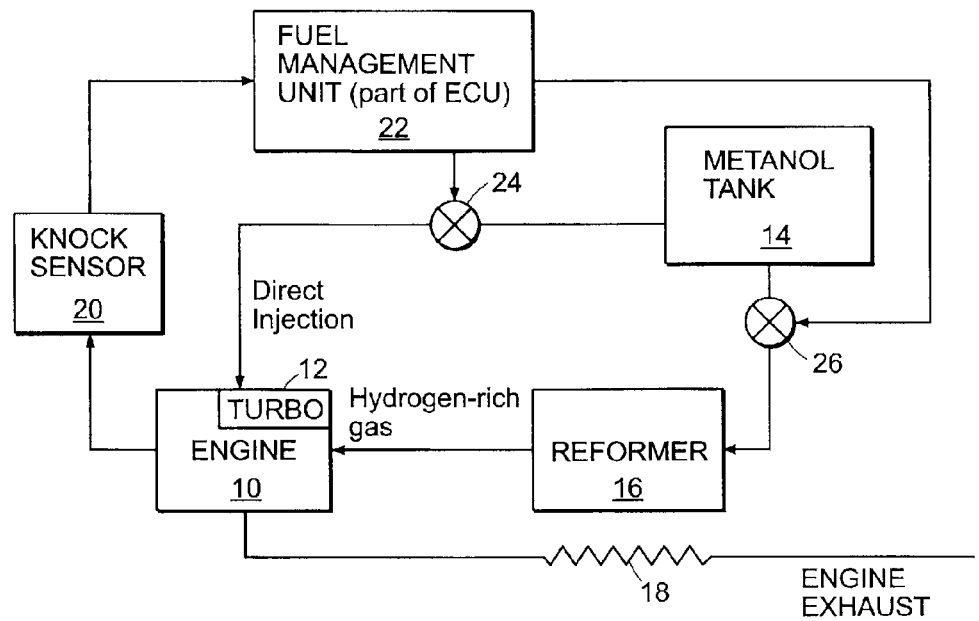
FIG. 1 is a block diagram of an embodiment of the invention disclosed herein.

The super-high efficiency engine according to the invention uses a combination of three features. The engine utilizes a very high compression ratio that is preferably in the range of 13-15 along with very high levels of turbo- or supercharger boost, for example, 2.5 times atmospheric pressure. The very high compression ratio and high levels of turbo- or supercharger boost are enabled by the strong knock suppression provided by the intrinsic octane of alcohol fuel plus the effect of evaporative cooling of injected alcohol.

A second feature resulting in the high efficiency engine of the invention is exhaust gas heat recovery by reforming of the alcohol using exhaust heat along with a suitable low-temperature, reforming catalyst. The alcohol is converted into a hydrogen-rich gas in an endothermic reaction. The third feature is burning the hydrogen-rich gas in the engine that enables very lean operation of the engine at low loads. The hydrogen-rich gas enables operation of the engine at a fuel/air ratio of 0.5 or less.

The strongest effect on efficiency is provided by direct injection of the alcohol. However, port fuel injection (PFI) into the manifold can also be used. When PFI is used, the timing and spatial orientation of the injector are such as to maximize evaporative cooling. It is preferred that stratified injection into the end gas region be used. Injection may occur when the air intake valve is open and it is preferred that location of the injector be near the air intake valve. The very high compression ratio operation disclosed herein, along with engine downsizing enabled by high turbo-boost can provide an efficiency increase of 25-30% relative to a conventional, naturally aspirated PFI gasoline engine.

In a preferred embodiment, pyrolytic reforming of methanol (decomposition where oxygen or water is not employed for reforming) in the reformer is particularly attractive. Near-pyrolytic reforming (with a small amount of air or water) is also attractive. Steam and/or partial reforming could be used for ethanol. The hydrogen-rich gas from the reformer is then combusted in the engine. The hydrogen-rich gas can be added through injection into the manifold. It is desirable to use alcohol that is not mixed with gasoline or mixed with only a small amount of gasoline in order to minimize catalyst sooting, and improve lifetime and performance. Heat recovery by reforming methanol can increase efficiency by around 10%.

The introduction of the hydrogen-rich gas further increases efficiency by around 10% by facilitating lean operation at low loads. At higher loads, the engine is operated with a stoichiometric fuel/air ratio and emissions are controlled by a highly effective, three-way catalyst as known in the art. The very lean operation is suitable for light-duty vehicles and heavy-duty vehicles that are not used for long-haul operation. The addition of the hydrogen-rich gas can also be used to enable operation with heavy EGR with a stiochiometric fuel/air ratio.

The efficiency gain achieved by combining the three effects discussed above can be maximized by reforming as much of the alcohol as possible while providing a sufficient amount of the direct (or port fuel) injected alcohol to prevent knock at high loads. A closed-loop feed back control circuit or an open loop control determines the ratio of direct (or port) injected alcohol to the amount of alcohol that is sent to the reformer in order to prevent knock as the load increases. It is preferred that the direct (or port injected) alcohol is used only in an amount needed to prevent knock.

An embodiment of the invention is shown in FIG. 1. In FIG. 1, an engine 10 including a turbocharger or supercharger portion 12 receives methanol, or a methanol-gasoline mixture with a sufficiently small gasoline concentration, from a methanol tank 14 that is directly injected into the engine 12. Methanol from the methanol tank 14 is also delivered to a reformer 16 that is in heat transfer relation with engine exhaust 18. A knock sensor 20 detects engine 10 knock and serves as an input to a fuel management control unit 22. The fuel management control unit 22 controls valves 24 and 26 to apportion the amount of methanol from the methanol tank 14 that is either directly injected into the engine 10 or delivered to the reformer 16 for generating hydrogen-rich gas for introduction into the engine 10. The fuel management control unit 22 may operate in an open-loop or closed-loop mode. This embodiment could also be employed with ethanol substituted for methanol.

A plasma (not shown) can be provided for rapid start-up of the reformer 16 or for providing additional heat to facilitate the reforming. Additional heat can also be provided by adding air into the reformer 16. Plasma or partial oxidation heating may be needed for certain engine conditions. The plasma can be a non-thermal plasma or an arc plasma operated as needed to provide additional heat. Plasma-enhanced reforming may be particularly important for cold start.

Figure 2:
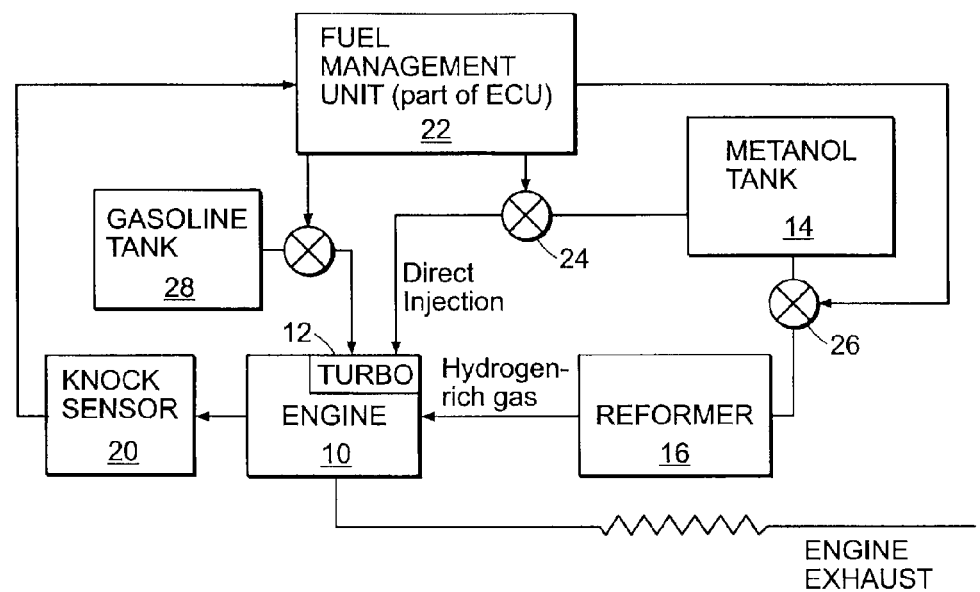
FIG. 2 is a block diagram of another embodiment of the invention disclosed herein.

Another embodiment of the invention is shown in FIG. 2. In this figure, a second tank 28 is provided for delivery of gasoline or a gasoline alcohol-mixture to the engine 10. In the embodiment of FIG. 2, there are now two fuel tanks. The first tank 14 is for alcohol (or alcohol with a low-enough gasoline concentration) and the second tank 28 is for gasoline or a mixture of alcohol and gasoline. The first tank would contain only fuel that provides the desired knock suppression. Fuel in the tank 14 would be sent to the reformer only if the concentration of gasoline is sufficiently low so as not to damage the reforming catalyst. Gasoline concentration may be determined by a sensor (not shown) which would then determine whether fuel would be sent to the reformer or not. Fuel from the second tank 28 could also be sent to the reformer if the gasoline concentration is sufficiently low. If the gasoline concentration is too high, the fuel from second tank 28 would be sent directly to the engine. A sensor could be used to determine whether gasoline from the second tank is sent to the reformer. A further embodiment would include a third tank into which fuel from the tank 28 could be transferred so as to allow filling of the tank with alcohol which would not damage the catalyst.

The fuel management unit 22 for the reformer-enhanced alcohol engine disclosed herein can also include a feature that uses sensor measurements of exhaust temperature and/or features of the reformate to control engine operation characteristics, including spark retard and fuel/air ratio, to achieve desired reformer performance. These measurements can also be employed to control plasma heating and to change the amount of air or water in the reformer. A closed- or open-loop control system can also control the duration of plasma heating needed for cold start.

It is noted that an embodiment of the invention may not use turbocharging. Without turbocharging, the engine system is considerably simpler than a turbocharged direct injection engine and could potentially be produced by retrofitting an existing port fuel injected, naturally aspirated gasoline engine. Such an engine could potentially provide an efficiency gain of over 30% over conventional port fuel injected, naturally aspirated gasoline engines.

While the greatest efficiency gain can be obtained when the alcohol is methanol, significant efficiency gains can be made when the alcohol is ethanol. When ethanol is used, it may be advantageous to use an ethanol-water mixture which maximizes the exhaust reforming process. One embodiment includes means for adding water to the tank that contains the ethanol. Mixtures of ethanol and methanol are contemplated and may also be used.

The optimized use of a very high compression ratio, high levels of pressure boost, and the use of a hydrogen-rich gas can provide a 15-25% (at least 15% and preferably over 20%) efficiency gain in a methanol-fueled spark ignition engine relative to a diesel engine in a light-duty vehicle in a typical drive cycle. This level of efficiency can also be obtained in a non-long-haul truck which has a high fraction of low load operation time. The efficiency gain over a naturally aspirated port fuel injected gasoline engine would be 40-55%. The efficiency gain over a diesel engine for a long-haul truck would be about 5-15%. The efficiency gain is lower because engines in these vehicles are operated mainly at high load.

It is recognized that modifications and variations of the present invention will be apparent to those of ordinary skill in the art and it is intended that all such modifications and variations be included within the scope of the appended claims.

What is claimed is:

1. Reformer-enhanced alcohol engine system comprising:
a spark ignition engine;
a source of alcohol;
a reformer including a low-temperature reforming catalyst in a heat transfer relation with exhaust gas from the engine and arranged to receive alcohol from the alcohol source for reforming the alcohol into a hydrogen-rich gas;
means for introducing the hydrogen-rich gas into the engine;
means for injecting the alcohol into the engine;
a fuel management control unit to apportion the ratio of alcohol injected into the engine to hydrogen-rich gas introduced into the engine so as to provide a sufficient amount of alcohol to prevent knock at high load; and
a knock sensor that detects the knock and serves as an input to the fuel management control unit permitting the fuel management control unit to apportion the amount of alcohol from an alcohol tank that is either introduced into the engine so as to provide evaporative cooling or delivered to the reformer for generating hydrogen-rich gas for introduction into the engine, wherein a closed-loop feed-back control circuit or an open loop control determines the ratio of direct injected alcohol to the amount of alcohol that is sent to the reformer in order to prevent knock as load on the engine increases.

2. The engine system of claim 1 wherein the fuel management system employs closed loop control using a knock detector.

3. The engine system of claim 1 wherein the fuel management system uses open loop control.

4. The engine system of claim 1 wherein the alcohol is direct injected.

5. The engine system of claim 1 wherein the alcohol is port fuel injected.

6. The engine system of claim 5 wherein injection is performed when an air intake valve is open and is injected in a sufficient amount to prevent knock at high loads.

7. The engine system of claim 1 wherein timing and spatial orientation of the injection are selected to maximize evaporative cooling.

8. The engine system of claim 1 wherein the injection is stratified in an end-gas region.

9. The engine system of claim 1 wherein the reformer is a pyrolytic reformer.

10. The engine system of claim 1 wherein the reformer is a near-pyrolytic reformer.

11. The engine system of claim 1 wherein the reformer uses steam or partial reforming.

12. The engine system of claim 1 wherein the hydrogen-rich gas is introduced into an engine manifold.

13. The engine system of claim 1 wherein the alcohol is mixed with a small amount of gasoline.

14. The engine system of claim 1 wherein the engine is operated at a fuel/air ratio of 0.5 or less.

15. The engine system of claim 1 further including an EGR system for use with a stoichiometric fuel/air ratio.

16. The engine system of claim 1 where the ratio of alcohol injected into the engine to hydrogen-rich gas introduced into the engine increases with increasing load.

17. The engine system of claim 1 further including plasma means for rapid start-up of the reformer or to provide additional heat to facilitate reforming.

18. The engine system of claim 17 wherein the plasma means generates a non-thermal plasma.

19. The engine system of claim 17 wherein the plasma means is an arc plasma.

20. The engine system of claim 1 further including a second source that provides fuel that is gasoline or an alcohol-gasoline mixture and means for injecting this fuel into the engine or into the reformer.

21. The engine system of claim 20 where a sensor is used to determine whether the fuel from the second source is directed to the engine or to the reformer.

22. The engine system of claim 21 wherein the engine characteristics include spark retard and fuel/air ratio.

23. The engine system of claim 1 wherein the fuel management control unit senses exhaust temperature or features of the hydrogen-rich gas to control engine characteristics.

24. The engine system of claim 1 where the compression ratio is at least 13.

25. The engine system of claim 24 where a turbocharger is used to provide a pressure of at least 2.5 times atmospheric pressure to the cylinders of the engine.

26. The engine system of claim 1 where only the amount of alcohol that is needed to prevent knock is injected into the engine.

27. The engine system of claim 1 where the fuel management system maximizes the amount of alcohol that is directed to the reformer.

28. The engine system of claim 1 where the alcohol is ethanol.

29. The engine system of claim 1 where the alcohol is methanol.

* * * * *